(12) United States Patent
Goldman (10) Patent No.: US 7,370,206 B1
(45) Date of Patent: May 6, 2008

(54) SELF-SIGNING ELECTRONIC DOCUMENTS

(75) Inventor: Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 610 days.

(21) Appl. No.: 10/656,593

(22) Filed: Sep. 4, 2003

(51) Int. Cl.
*H04L 9/00* (2006.01)
*H04K 1/00* (2006.01)

(52) U.S. Cl. .................. 713/176; 705/54; 713/170; 713/175

(58) Field of Classification Search ............... 713/176, 713/180, 170; 705/54
See application file for complete search history.

(56) References Cited

U.S. PATENT DOCUMENTS

| | | | | |
|---|---|---|---|---|
| 5,465,299 A * | 11/1995 | Matsumoto et al. | ........ | 713/176 |
| 5,606,609 A * | 2/1997 | Houser et al. | ............ | 713/179 |
| 5,787,175 A * | 7/1998 | Carter | ................ | 713/165 |
| 6,039,248 A * | 3/2000 | Park et al. | ............. | 235/379 |
| 6,047,374 A * | 4/2000 | Barton | ................ | 713/150 |
| 6,079,018 A * | 6/2000 | Hardy et al. | ............ | 713/170 |
| 6,088,454 A * | 7/2000 | Nagashima et al. | ......... | 380/286 |
| 6,108,425 A * | 8/2000 | Smith et al. | ............ | 380/277 |
| 6,170,744 B1 * | 1/2001 | Lee et al. | .............. | 235/380 |
| 6,253,322 B1 * | 6/2001 | Susaki et al. | ............ | 713/170 |
| 6,253,323 B1 * | 6/2001 | Cox et al. | .............. | 713/176 |
| 6,618,855 B1 * | 9/2003 | Lindholm et al. | .......... | 717/126 |
| 6,785,815 B1 * | 8/2004 | Serret-Avila et al. | ....... | 713/176 |
| 6,796,489 B2 * | 9/2004 | Slater et al. | ................ | 235/379 |
| 6,807,633 B1 * | 10/2004 | Pavlik | ................ | 713/170 |
| 6,898,707 B1 * | 5/2005 | Sit et al. | ................ | 713/167 |
| 6,928,548 B1 * | 8/2005 | Hale et al. | ................ | 713/187 |
| 6,959,382 B1 * | 10/2005 | Kinnis et al. | ............... | 713/170 |
| 7,051,206 B1 * | 5/2006 | Giest et al. | ................. | 713/176 |
| 7,130,445 B2 * | 10/2006 | Ruhl et al. | ................... | 382/100 |
| 7,152,158 B2 * | 12/2006 | Watanabe et al. | .......... | 713/156 |
| 7,249,258 B2 * | 7/2007 | Honda et al. | ............... | 713/176 |
| 2002/0029337 A1 * | 3/2002 | Sudia et al. | ................ | 713/176 |
| 2002/0112162 A1 * | 8/2002 | Cocotis et al. | ............. | 713/176 |
| 2002/0129256 A1 * | 9/2002 | Parmelee et al. | ........... | 713/180 |
| 2002/0184485 A1 * | 12/2002 | Dray et al. | ................ | 713/150 |
| 2002/0184504 A1 * | 12/2002 | Hughes | ...................... | 713/177 |
| 2003/0023564 A1 * | 1/2003 | Padhye et al. | ................ | 705/54 |
| 2004/0128503 A1 * | 7/2004 | Watanabe et al. | ........... | 713/157 |
| 2004/0139023 A1 * | 7/2004 | Huang et al. | ................ | 705/51 |
| 2005/0010752 A1 * | 1/2005 | Solsona et al. | ............. | 713/151 |
| 2005/0021474 A1 * | 1/2005 | Geist et al. | .................... | 705/63 |
| 2006/0112165 A9 * | 5/2006 | Tomkow et al. | ............ | 709/206 |

* cited by examiner

*Primary Examiner*—Emmanuel L. Moise
*Assistant Examiner*—Techane J. Gergiso
(74) *Attorney, Agent, or Firm*—Fish & Richardson P.C.

(57) ABSTRACT

Methods and apparatus, including computer program products, implement techniques for performing digital signature operations on electronic content. An electronic document includes a digital signature module. The electronic document is accessed using a user application. The digital signature module is used to perform one or more digital signature operations on the electronic document in the user application.

52 Claims, 5 Drawing Sheets

SELF-SIGNING ELECTRONIC DOCUMENTS

BACKGROUND

The present invention relates to digital signatures and signing electronic documents.

Electronic document workflows often involve the transfer and processing of digitally signed electronic documents. In some workflows, the recipient of a digitally signed document is expected to manipulate the document in some way—for example, by filling in one or more form fields—and then to attach his or her own digital signature to the document and transfer the signed document to another entity, such as the original sender or a further entity in the workflow. The digital signature can be used to verify the identity of the entity signing the electronic document. The digital signature can also be used to authenticate the signed document by enabling the detection of any alterations made to the signed electronic document.

A digital signature can be attached to the electronic document using a digital signature application. One class of common digital signature application generates a digest of the electronic document and encrypts the digest using a private key obtained by the entity in order to generate the digital signature. The digest can be generated by calculating a hash value of the electronic document according to digital signature algorithm provided by the digital signature application. The entity signing the electronic document can obtain a private key from a signature authority along with a public key certificate associated with the private key. The public key certificate is typically sent along with the signed electronic document. The recipient of the electronic document uses the public key certificate to retrieve a public key corresponding to the received public key certificate. The recipient typically uses the digital signature application to generate a digest of the electronic document, and uses the digest along with the public key to verify the attached digital signature.

There are a number of different digital signature applications that implement different digital signature protocols. As a result, it can be difficult to ensure that recipients of a particular electronic document will have access to a particular digital signature algorithm.

SUMMARY OF THE INVENTION

In general, in one aspect, the invention provides methods and apparatus, including computer program products, implementing techniques for performing digital signature operations on electronic content. The techniques include accessing an electronic document using a user application, where the electronic document includes a digital signature module, and using the digital signature module to perform one or more digital signature operations on the electronic document in the user application.

Advantageous implementations of the invention include one or more of the following features. Using the digital signature module can include validating the digital signature module and using the digital signature module to perform digital signature operations only if the digital signature module is validated. Using the digital signature module can include signing the electronic document using the digital signature module and authenticating a digital signature in the electronic document. The digital signature operations can be performed using a digital signature module running on a server. The electronic document can include a reference to the digital signature module. Using the digital signature module to perform a digital signature operation can include receiving a request to perform a digital signature operation, determining whether the requested digital signature operation is authorized, and using the digital signature module to perform the requested digital signature operation if the digital signature operation is authorized. Rights information associated with the digital signature module, the user application, or the electronic document can be used to determine whether the requested digital signature operation is authorized. The rights information can be used to specify digital signature operations that can be performed on the electronic document and to specify constraints on the digital signature operations that can be performed on the electronic document. Using the digital signature module can also include performing a digital signature operation on a portion of the electronic document or on a user added content portion of the electronic document.

Advantageous implementations of the invention also include receiving input adding content to the electronic document in the user application, and using the digital signature module to perform digital signature operations on the added content. Input modifying content of the electronic document can be received and the digital signature module can be used to perform digital signature operations on the modified content. The electronic document can be a PDF document.

In another aspect, the invention provides methods and apparatus implementing techniques for embedding a digital signature module in an electronic document, where the digital signature module is operable to perform one or more digital signature operations on the electronic document. A first version of the electronic document is provided to a recipient, and a second version of the electronic document is received from the recipient. The first version includes an embedded digital signature module. The second version includes digital signature information indicating that a digital signature operation has been performed on the electronic document using the embedded data signature module. The digital signature module can be signed using a digital signature. Rights information can be embedded in the electronic document, where the rights information enables a set of rights required to perform the digital signature operations.

In another aspect, the invention provides an electronic document including electronic content and a digital signature module. The digital signature module is operable upon loading to perform digital signature operations on the electronic content. The electronic document can include rights information enabling one or more operations on the electronic document. Rights information can enable signing the electronic document using the digital signature module.

In another aspect, the invention provides methods and apparatus implementing techniques for processing a signed electronic document. A signed electronic document is received. The electronic document includes a digital signature module and a digital signature generated by the digital signature module. The electronic document is accessed in a user application, and the digital signature is validated using the digital signature module in the user application.

Advantageous implementations include one or more of the following features. The techniques include performing a digital signature operation embedding digital signature information in the electronic document using the digital signature module. The digital signature operation is performed after optionally modifying the electronic document. The electronic document is transmitted, including the digital signature module and the digital signature information. Receiving a signed electronic document can include receiving the signed electronic document as a user in a multi-user sequence defined by a workflow, and transferring the electronic document can include transferring the electronic document to another user in the workflow. Performing the digital signature operation can include performing the digital signature operation on a portion of the electronic document, and transferring the electronic document can include transferring only the portion of the electronic document on which the digital signature operation is performed. The techniques include receiving input adding content to the electronic document in the user application, and using the digital signature module to perform a digital signature operation on the added content. The techniques include receiving input modifying content of the electronic document in the user application, and using the digital signature module to perform digital signature operations on the modified content.

The invention can be implemented to realize one or more of the following advantages. Electronic documents can be distributed widely by a document provider with no prior knowledge of the digital signature applications available to the intended or expected recipients of the electronic document. The document provider specifies a digital signature application to be used for digital signature operations on the electronic document using a digital signature module included in the electronic document. Recipients of the electronic document can perform digital signature operations on the received document with no knowledge of the specific digital signature application required by the document provider. The digital signature operations that can be performed by the recipients of the electronic document include digitally signing the document to attach a digital signature and verifying a digital signature attached to the document. The recipients of the electronic document can perform digital signature operations using the digital signature module without having to explicitly obtain or install the provider specified digital signature application. The provider of the electronic document can grant recipient-specific rights to perform the digital signature operations. The provider of the electronic document can also specify constraints on the digital signature operations that can be performed. If the recipient of the electronic document does not have a digital signature application, he can perform digital signature operations using the digital signature module. If the recipient of the electronic document has a digital signature application different from the digital signature application required by the document provider, the digital signature operations on the received document are performed using the digital signature module. If the recipient of the electronic document does not have the private keys required by the document provider to perform digital signature operations on the received content, the digital signature module can be used to obtain the required private keys. If the recipient of the electronic document cannot recognize public certificates used by the document provider, the public certificates can be included in the digital signature module and the digital signature module can perform operations requiring the use of the public key certificate. The digital signature module is authenticated using a module authentication signature; thereby authenticating digital signatures attached or verified using the digital signature module. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
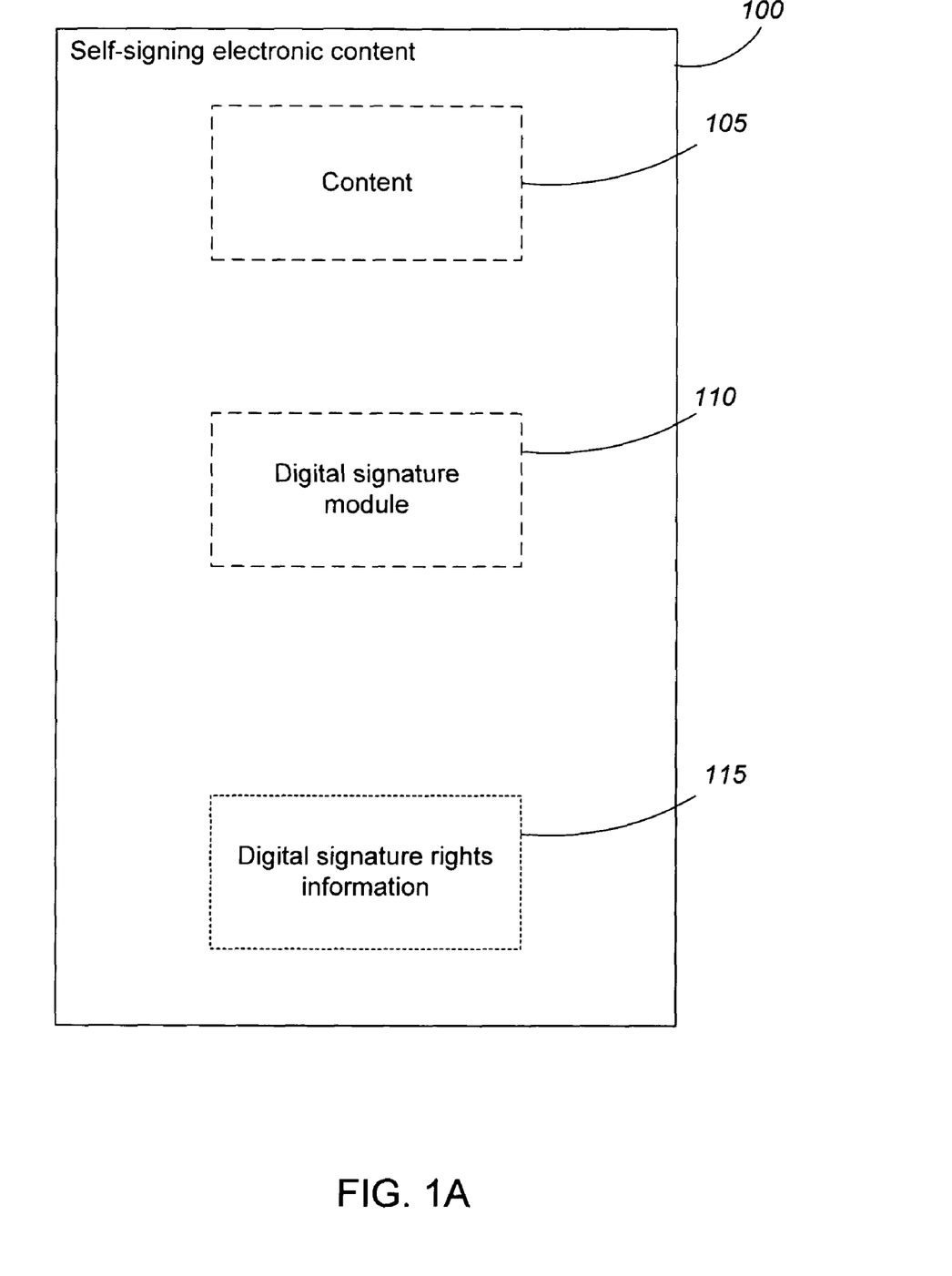
FIG. 1A illustrates a conceptual view of a self-signing electronic document.

FIG. 1A illustrates a conceptual view of a self-signing electronic document 100. The document 100 includes electronic content 105, and a digital signature module 110 to be used for performing digital signature operations on the electronic content 105. Electronic content is an aggregation of digital data, which can represent, for example, text, graphics, audio, video, electronic documents, instructions and other information stored in an electronic file. A self-signing electronic document 100 does not necessarily correspond to a file. The self-signing electronic document 100 can be stored in a portion of a file containing other electronic content not operated on by the digital signature module 110. The self-signing electronic document 100 can also reference external electronic content stored in files other than the file used to store the self-signing electronic document 100. In one implementation, the external electronic content can be operated on using the digital signature module 110. The electronic document 100 can be stored using a number of electronic file formats, e.g., an Adobe PDF file.

A user application, e.g., Adobe Acrobat, is used by the user to access electronic documents. The user application can also be used by the user to edit, modify, or add content to electronic documents. The user application can be used in a multi-user workflow.

The digital signature module 110 is operable to perform digital signature operations on the electronic content 105. A digital signature operation is an operation performed to generate or use a digital signature. A digital signature is a data value included in an electronic document 100, which uniquely identifies the content of the electronic document 100 and the identity of an entity responsible for signing the electronic document 100. Thus, one example of performing a digital signature operation includes digitally signing an electronic document 100. In one implementation, performing the digital signature operation to sign the electronic content 105 includes digitally signing the electronic content 105 by generating a content digest of the actual data in the electronic content 105, encrypting the content digest with a private key of the entity initiating the digital signature operation, and attaching the encrypted content digest to the electronic content 105. Performing a digital signature operation also includes verifying the electronic content 105 or the identity of the entity signing the electronic content 105 using the digital signature attached to the electronic content 105.

The digital signature module 110 can be a stand-alone digital signature application used to perform digital signature operations on the electronic content 105. The digital signature module 110 can also be an extension module for the user application such that the digital signature module is used in conjunction with the user application to perform digital signature operations on the electronic content. Alternatively, the digital signature module 110 can specify a preferred digital signature algorithm for the electronic content 105, e.g., Entrust®, Verisign®, or SelfSign® algorithms, and the user application can perform digital signature operations on the electronic content 105 using the preferred digital signature algorithm. The preferred digital signature algorithm can be distributed with the user application or it can be obtained by the user application upon request. If the recipient of the electronic document does not have private keys required by the document provider to perform digital signature operations on the received content, the digital signature module can be used to obtain the required private keys. If the recipient of the electronic document cannot recognize public certificates used by the document provider, the public certificates can be included in the digital signature module and the digital signature module can perform operations requiring the use of the public key certificate. Digital signature module 110 is operable to perform digital signature operations that include attaching a digital signature to the electronic content 105, e.g., by appending the digital signature to the document with a pointer or other reference to the relevant content, and verifying a digital signature attached to the electronic content 105. Typically, the digital signature is attached to the electronic content 105 that is being signed. Verifying a digital signature can verify both the identity of the entity signing the electronic content 105, and the contents of the electronic content 105.

Performing digital signature operations on the electronic content 105 includes performing digital signature operations on a portion of the electronic content 105. A user can modify the electronic content 105 and perform digital signature operations on the modified electronic content 105 or a portion of the modified electronic content 105. For example, the electronic content 105 can be a form and the user can attach a digital signature to the form after completing predefined form fields. After performing digital signature operations on the electronic content 105, the user can transmit the electronic content 105 to the provider of the electronic document. Alternatively, the self-signing electronic document 100 can be part of a workflow and the user can perform operations, including the digital signature operations, as required by the workflow before transmitting the electronic content 105 to the next entity in the workflow. Transmitting the electronic content includes transmitting the entire electronic document, or the portion of the electronic document on which the digital signature operation was performed. For example, the user completing the predefined form fields can perform a digital signature operation to digitally sign only the data entered in the predefined form fields and transmit only the data and digital signature.

The self-signing electronic document 100 can include one or more digital signature modules. Entities performing digital signature operations on the electronic content 105 can use a preferred digital signature module from the included digital signature modules. For example, in a workflow for two users each having a preferred digital signature module, the preferred digital signature module for both users can be included in the document 100. The first user can sign the document 100 using the included digital signature module for the first user, and the second user can verify the signed document 100 using the included digital signature module for the first user, and sign the document 100 using the included digital signature module for the second user.

The self-signing electronic content 100 can optionally include digital signature rights information 115. If specific rights or permissions are required by the digital signature module 110 in order to perform digital signature operations on the electronic content 105, the digital signature rights information 115 can be used to provide the required rights. In one implementation, the digital signature module operates as an extension for a user application and the required rights are obtained from the user application. In an alternative implementation, the required rights include permissions that must be obtained from an operating system running on a computer used to perform the digital signature operations. A provider of a self-signing electronic document 100 can provide different digital signature operations for different users by attaching different digital signature rights information 115 to the electronic content 105. For example, the provider can generate two sets of digital signature rights information 115, where the first set of digital signature rights information 115 authorizes the performance of all digital signature operations and the second set of digital signature rights information 115 authorizes only a subset of digital signature operations, for example, the verification of attached digital signatures. A user receiving a document containing the second set of digital signature rights information 115 would only be able to verify digital signatures, while a user receiving a document containing the first set of digital signature rights information 115 would be able to verify digital signatures and attach digital signatures. A provider of a self-signing electronic document can also use the digital signature rights information 115 to impose constraints on the digital signature operations that can be performed, e.g., the provider can specify that digital signature operations cannot be performed on the electronic content 105 after a specified duration of time has elapsed.

Figure 1B:
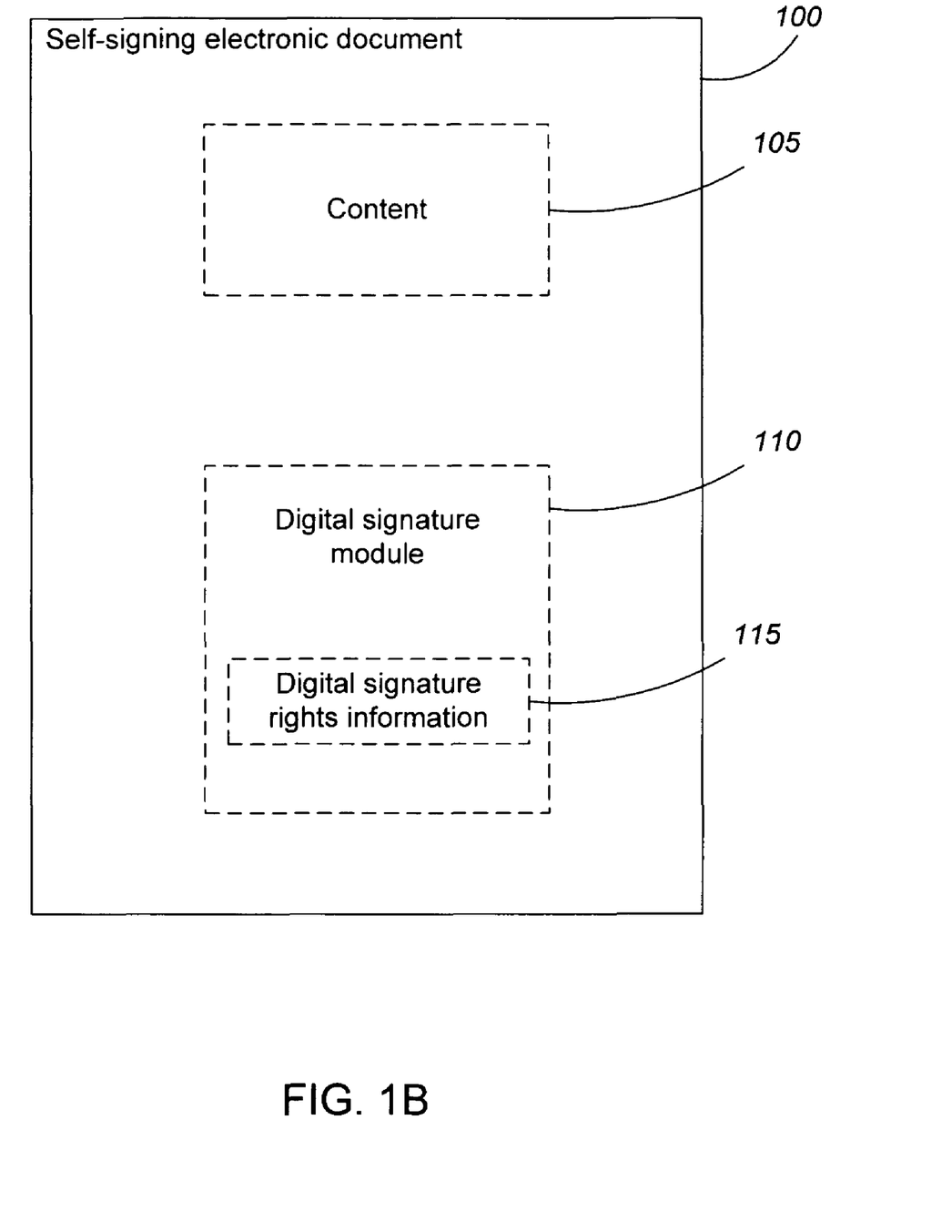
FIG. 1B illustrates another conceptual view of the self-signing electronic document.

FIG. 1B illustrates another conceptual view of a self-signing electronic document where the digital signature rights information 115 is included in the digital signature module 110.

Figure 2:
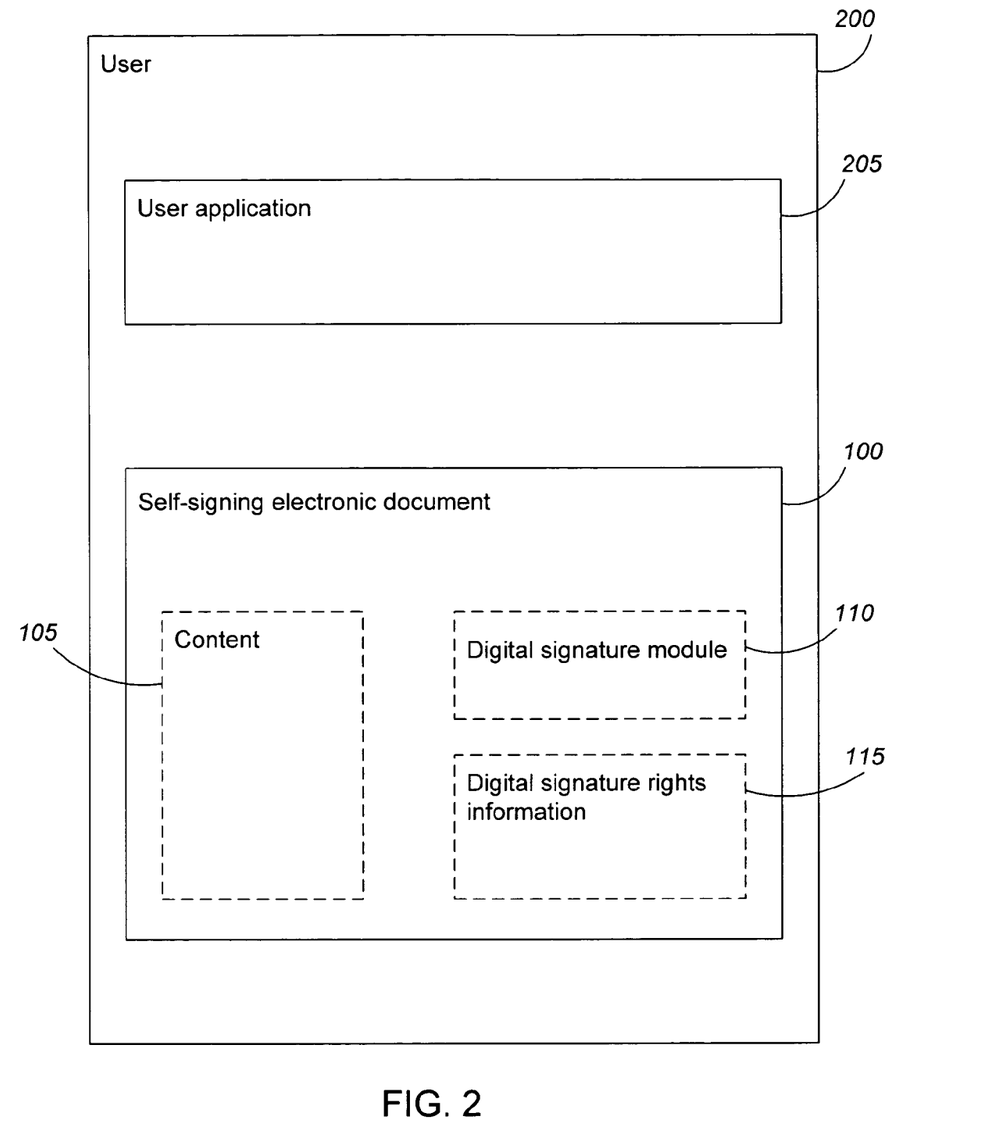
FIG. 2 is a conceptual diagram of an exemplary implementation from a user's point of view.

FIG. 2 illustrates one implementation of a system for processing self-signing electronic documents according to one aspect of the invention from a user's point of view. The user 200 receives a self-signing electronic document 100 containing electronic content 105 and digital signature module 110. The user accesses the self-signing electronic document 100 with a user application 205. In the illustrated implementation, the digital signature module 110 operates as an extension to the user application 205 and the user application 205 is used to perform digital signature operations in accordance with the digital signature module 110. The digital signature rights information 115 specifies digital signature operations that can be performed by the user 200 by providing any rights and/or permissions required to enable the digital signature module 110 or the user application 205.

The digital signature rights information 115 can include a digital signature of the digital signature module 110, referred to as the module authentication signature. Alternatively, the module authentication signature can be attached to the digital signature module 110 or otherwise included in the self-signing electronic document 100. As described below, the digital signature module 110 is authenticated using the module authentication signature. The module authentication signature is generated using a digital signature application that is different from the digital signature module 110 included in the self-signing electronic document 100. The module authentication signature is used to establish the authenticity of the digital signature module 110, and consequently establishes the authenticity of digital signatures that are attached or verified using the digital signature module 110.

Figure 3:
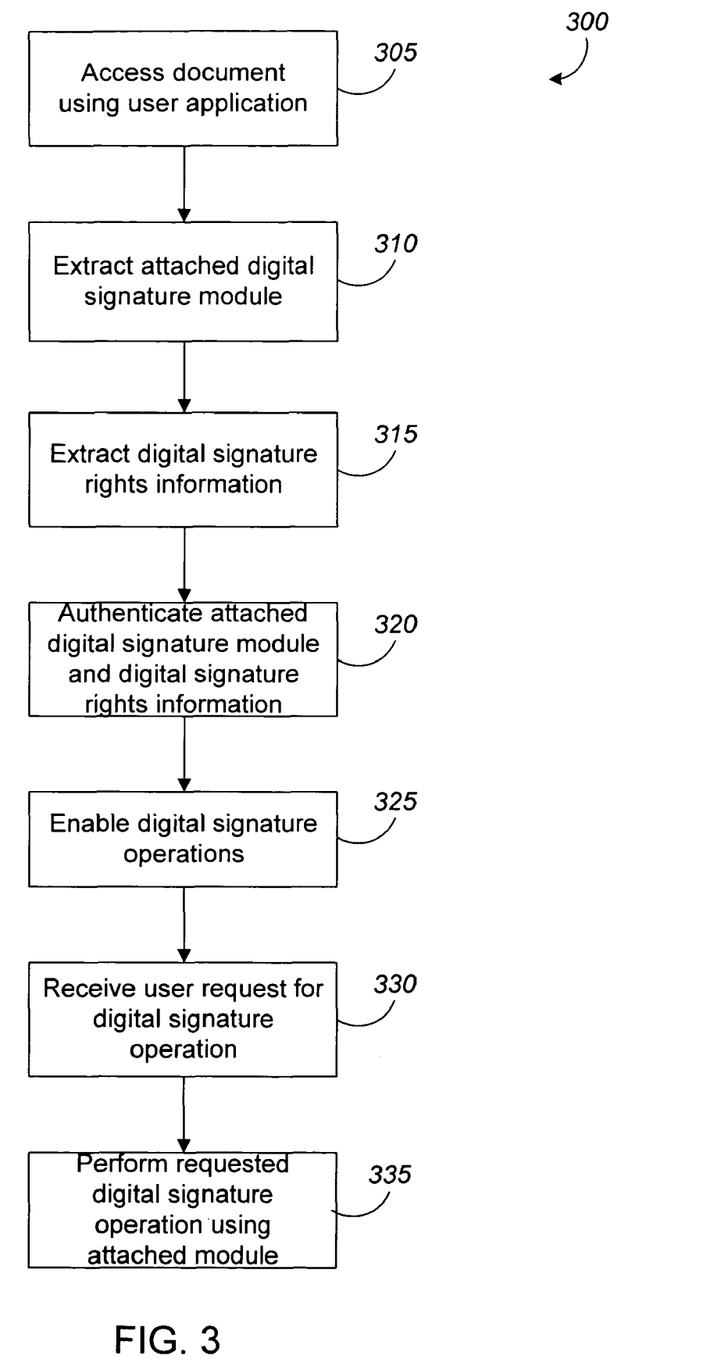
FIG. 3 is a flow diagram illustrating a method used by the user to perform a digital signature operation on the self-signing electronic document.

FIG. 3 illustrates a method 300 by which the user performs digital signature operations on a self-signing electronic document 100. The user application 205 (FIG. 2) is used to access the self-signing electronic document 100 (step 305). Accessing the electronic document 100 can include viewing the electronic document 100 and/or accessing the electronic document 100 to perform digital signature operations. Accessing the electronic document 100 can also include editing the electronic document 100 and/or entering data in specified fields of the electronic document 100. In one implementation, the user performs digital signature operations on the electronic document 100 without viewing or editing the electronic document 100, e.g., when the user digitally signs an existing electronic document for distribution without modification. In an alternative implementation, the self-signing electronic document 100 is a form, and the user signs the electronic document 100 after filling in one or more of the form fields.

The user application 205 also extracts the attached digital signature module 110 (step 310) and the digital signature rights information 115, (step 315). The digital signature module 110 is authenticated using the module authentication signature (step 320). The digital signature rights information 115 is also authenticated using a corresponding digital signature. In one implementation, the digital signature module 110 and the digital signature rights 115 are authenticated using a default digital signature application provided by the user application 205. If the digital signature rights information 115 is authenticated, the user application enables the digital signature operations based on the digital signature rights information 115 (step 325). The user application receives user requests for digital signature operations to be performed on the self-signing electronic document 100 (step 330), and performs the requested digital signature operations using the attached digital signature module 110 (step 335). In one implementation, the digital signature operations are enabled only for the self-signing electronic document 100 containing the digital signature module 110 and the digital signature rights information 115. In an alternative implementation, the user can use the digital signature module 110 to perform digital signature operations on electronic documents other than the self-signing electronic document 100, e.g., one or more electronic documents (or categories of electronic documents) that are identified in the digital signature rights information 115.

The digital signature operations requested by the user can include a request to digitally sign the self-signing electronic document 100. If the user receives a self-signing electronic document 100 that has been digitally signed, the user can request a validation of the attached digital signature. Validation can also be performed automatically—e.g., upon opening of the self-signing electronic document 100.

Figure 4:
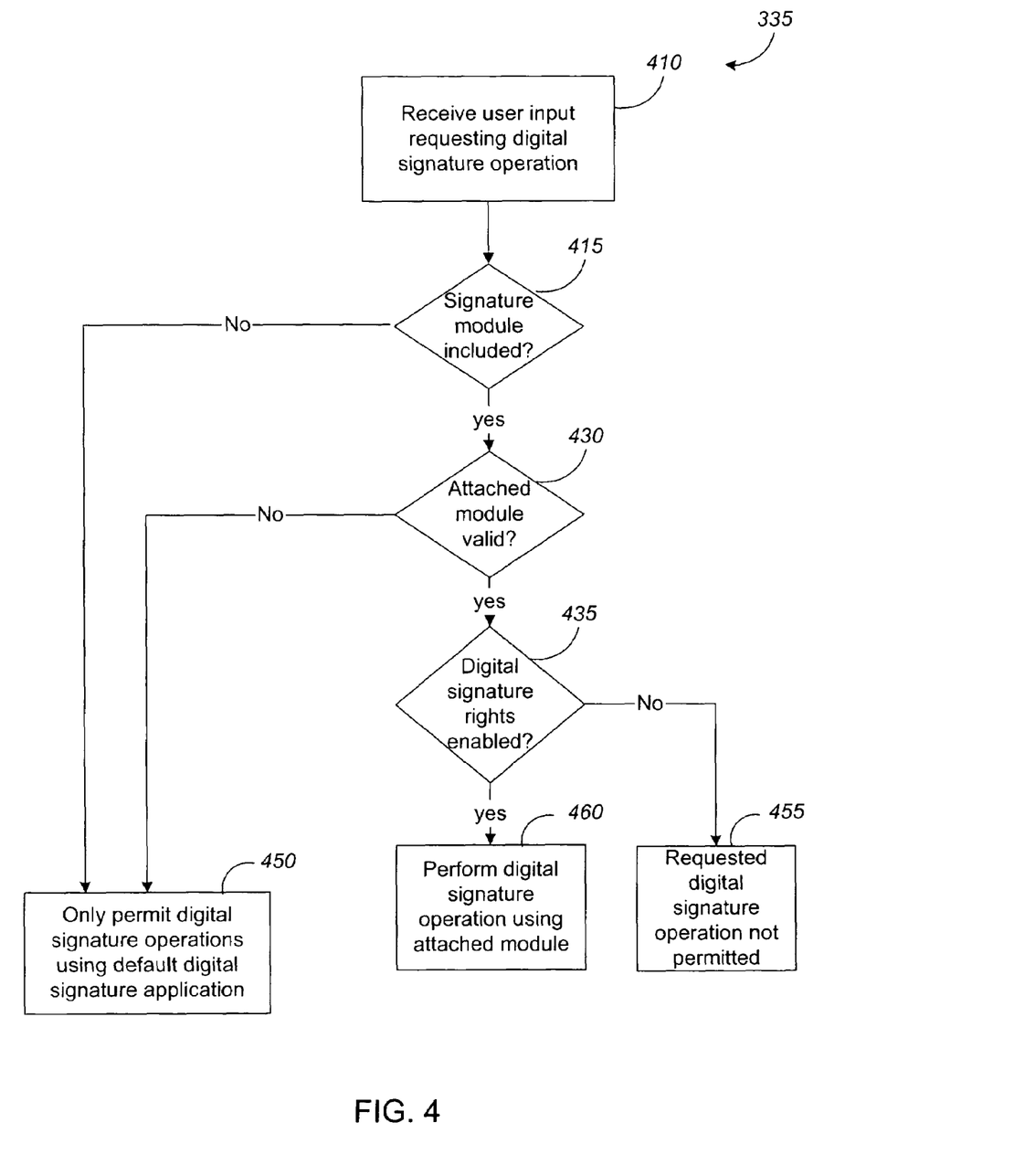
FIG. 4 is a flow diagram illustrating a method for performing the requested digital signature operation, in accordance with one aspect of the invention.

FIG. 4 is a flow diagram illustrating a method performing the requested digital signature operation in step 335, in accordance with one aspect of the invention. The method receives user input requesting a digital signature operation on the received self-signing electronic document 100 (step 410). If a digital signature module 110 is not included in the self-signing electronic document 100 ("no" branch of decision step 415), the method only permits digital signature operations using a default digital signature application supported by the user application 205 (step 450). The default digital signature application can be included in the user application 205 or obtained separately from the user application developer or a third party developer. If a digital signature module 110 is included in the self-signing electronic document 100 ("yes" branch of decision step 415), the method authenticates the digital signature module 110 as described above in the context of step 320, FIG. 3. If the attached digital signature module 110 is not valid ("no" branch of decision step 430), the method only permits digital signature operations using the default digital signature application supported by the user application 205 (step 450).

If the attached digital signature module 110 is valid ("yes" branch of decision step 430), the method checks if the requested digital signature operation is available (e.g., if the rights and/or permissions required to enable the requested digital signature operation are provided by the digital signature rights information 115) for the self-signing electronic document 100 (step 435). The digital signature operation can be enabled by default in the user application or enabled pursuant to rights and/or permissions provided by the digital signature rights information 115 attached to the self-signing electronic document 100. If the requested digital signature operation is not enabled ("no" branch of decision step 435), the method does not permit the requested digital signature operation to proceed (step 455). If the permissions required by the requested digital signature operation are enabled ("yes" branch of decision step 435), the requested digital signature operation is performed using the attached digital signature module 110 (step 460).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer implemented method, comprising:
   accessing a first electronic document using a user application, the first electronic document including embedded digital signature rights information and an embedded digital signature module, the digital signature module being operable to perform digital signature operations on the first electronic document;
   extracting the embedded digital signature rights information and the embedded digital signature module using the user application;
   authenticating the extracted digital signature rights information and the extracted digital signature module;
   using the digital signature module to perform one or more of the digital signature operations on the first electronic document in the user application where using the digital signature module to perform the one or more digital signature operations includes:
      receiving a request to perform a digital signature operation,
      determining whether the requested digital signature operation is authorized,
      and if the digital signature operation is authorized, using the digital signature module to perform the requested digital signature operation;
   identifying a second electronic document, the second electronic document being a document other than the first electronic document, the second electronic document being identified in the digital signature rights information of the first electronic document; and
   using the digital signature module to perform one or more of the digital signature operations on the second electronic document in the user application.

2. The method of claim 1, wherein using the digital signature module includes:
   validating the digital signature module; and
   using the digital signature module to perform other digital signature operations only if the digital signature module is validated.

3. The method of claim 1, wherein:
   using the digital signature module includes signing the first and second electronic documents.

4. The method of claim 1, wherein:
   using the digital signature module includes authenticating a digital signature in the first and second electronic documents.

5. The method of claim 1, wherein:
   using the digital signature module includes using the digital signature module running on a server.

6. The method of claim 1, wherein:
   including the digital signature module includes including a reference to the digital signature module.

7. The method of claim 1, wherein:
   determining whether the requested digital signature operation is authorized includes determining whether the requested digital signature operation is authorized based on rights information associated with the digital signature module, the user application, or the first electronic document.

8. The method of claim 7, wherein:
   the rights information is operable to specify the digital signature operations that can be performed on the first and second electronic documents.

9. The method of claim 8, wherein:
   the rights information is operable to specify constraints on the digital signature operations that can be performed on the first or second electronic document.

10. The method of claim 1, wherein:
    using the digital signature module includes performing a digital signature operation on a portion of the first or second electronic document or on a user added content portion of the first or electronic document.

11. The method of claim 1, further comprising:
    receiving input adding content to the first or second electronic document in the user application, wherein using the digital signature module includes performing a digital signature operation on the added content.

12. The method of claim 1, further comprising:
    receiving input modifying content of the first or second electronic document in the user application, wherein using the digital signature module includes performing the digital signature operations on the modified content.

13. The method of claim 1, wherein:
    the first or second electronic document is a PDF document.

14. An electronic document tangibly embodied in a computer readable storage medium, the electronic document comprising:
    electronic content;
    digital signature rights information, the digital signature rights information being embedded in the electronic document, the digital signature rights information identifying one or more other electronic documents, each one or more other electronic documents comprising electronic content, the digital signature rights information enabling one or more digital signature operations on the electronic document and the one or more other electronic documents; and a digital signature module, the digital signature module being embedded in the electronic document, the digital signature module being operable to perform digital signature operations on the electronic content of the electronic document and the electronic content of the one or more other electronic documents, where using the digital signature module to perform the one or more digital signature operations includes:

receiving a request to perform a digital signature operation, determining whether the requested digital signature operation is authorized, and if the digital signature operation is authorized, using the digital signature module to perform the requested digital signature operation.

15. A computer implemented method, comprising:

receiving a signed first electronic document, the first electronic document including digital signature rights information, a digital signature module and a digital signature generated by the digital signature module, the digital signature module being operable to perform digital signature operations;

accessing the first electronic document in a user application;

validating the digital signature in the first electronic document using the digital signature module in the user application;

using the digital signature module to perform one or more of the digital signature operations, where using the digital signature module to perform the one or more digital signature operations includes:

receiving a request to perform a digital signature operation, determining whether the requested digital signature operation is authorized, and if the digital signature operation is authorized, using the digital signature module to perform the requested digital signature operation;

accessing a second electronic document, the second electronic document being a document other than the first electronic document, the second electronic document being identified by the digital signature rights information in the first electronic document; and performing digital signature operations on the second electronic document.

16. The method of claim 15, further comprising:

performing a digital signature operation embedding digital signature information in the first or second electronic document, the digital signature operation being performed using the digital signature module after optionally modifying the first or second electronic document; and transmitting the first or second electronic document, including the embedded digital signature module and the digital signature information.

17. The method of claim 15, wherein:

receiving a signed first electronic document includes receiving the signed first electronic document as a user in a multi-user sequence defined by a workflow; and transmitting the first electronic document includes transmitting the first electronic document to another user in the workflow.

18. The method of claim 15, wherein:

performing the digital signature operation includes performing the digital signature operation on a portion of the first or second electronic document; and transmitting the first or second electronic document includes transmitting only the portion of the first or second electronic document on which the digital signature operation is performed.

19. The method of claim 15, further comprising:

receiving input adding content to the first or second electronic document in the user application, wherein using the digital signature module includes performing a digital signature operation on the added content.

20. The method of claim 15, further comprising:

receiving input modifying content of the first or second electronic document in the user application wherein using the digital signature module includes performing a digital operation on the modified content.

21. A computer program product implementing a user application, tangibly embodied in a computer readable storage medium, the computer program product comprising instructions operable to cause data processing equipment to:

access a first electronic document, the first electronic document including embedded digital signature rights information and an embedded digital signature module, the digital signature module being operable to perform digital signature operations on the first electronic document;

extracting the embedded digital signature rights information and the embedded digital signature module using the user application;

authenticating the extracted digital signature rights information and the extracted digital signature module;

use the digital signature module to perform one or more of the digital signature operations on the first electronic document where the instructions for using the digital signature module to perform the one or more digital signature operations include instructions to:

receive a request to perform a digital signature operation, determine whether the requested digital signature operation is authorized, and if the digital signature operation is authorized, use the digital signature module to perform the requested digital signature operation;

identify a second electronic document, the second electronic document being a document other than the first electronic document, the second electronic document being identified in the digital signature rights information of the first electronic document; and use the digital signature module to perform one or more of the digital signature operations on the second electronic document.

22. The computer program product of claim 21, wherein the instructions for using the digital signature module cause the data processing equipment to:

validate the digital signature module; and use the digital signature module to perform other digital signature operations only if the digital signature module is validated.

23. The computer program product of claim 21, wherein the instructions for using the digital signature module cause the data processing equipment to:

sign the first and second electronic documents.

24. The computer program product of claim 21, wherein the instructions for using the digital signature module cause the data processing equipment to:
   authenticate the first and second electronic documents.

25. The computer program product of claim 21, wherein the instructions for using the digital signature module cause the data processing equipment to:
   use the digital signature module running on a server.

26. The computer program product of claim 21, wherein including the digital signature module includes including a reference to the digital signature module.

27. The computer program product of claim 21, wherein the instructions for determining whether the requested digital signature operation is authorized cause the data processing equipment to:
   determine whether the requested digital signature operation is authorized based on rights information associated with the digital signature module, the user application, or the first electronic document.

28. The computer program product of claim 27, wherein the rights information is operable to specify the digital signature operations that can be performed on the first or second electronic document.

29. The computer program product of claim 28, wherein the rights information is operable to specify constraints on the digital signature operations that can be performed on the first or second electronic document.

30. The computer program product of claim 21, wherein the instructions for using the digital signature module cause the data processing equipment to:
   perform a digital signature operation on a portion of the first or second electronic document or on a user added content portion of the first or second electronic document.

31. The computer program product of claim 21, further comprising receiving input adding content to the first or second electronic document in the user application, wherein the instructions for using the digital signature module cause the data processing equipment to:
   perform a digital signature operation on the added content.

32. The computer program product of claim 21, further comprising receiving input modifying content of the first or second electronic document in the user application, wherein the instructions for using the digital signature module cause the data processing equipment to:
   perform a digital signature operation on the modified content.

33. The computer program product of claim 21, wherein:
   the first or second electronic document is a PDF document.

34. A computer program product implementing a user application, tangibly embodied in a computer readable storage medium, the computer program product comprising instructions operable to cause data processing equipment to:
   receive a signed first electronic document, the first electronic document including digital signature rights information, a digital signature module and a digital signature generated by the digital signature module, the digital signature module being operable to perform digital signature operations;
   access the first electronic document in the user application;
   validate the digital signature in the first electronic document using the digital signature module in the user application;
   use the digital signature module to perform one or more of the digital signature operations, where the instructions for using the digital signature module to perform the one or more digital signature operations include instructions to:
      receive a request to perform a digital signature operation,
      determine whether the requested digital signature operation is authorized, and if the digital signature operation is authorized, use the digital signature module to perform the requested digital signature operation,
      access a second electronic document, the second electronic document being a document other than the first electronic document, the second electronic document being identified by the digital signature rights information in the first electronic document; and
      perform digital signature operations on the second electronic document.

35. The computer program product of claim 34, further comprising instructions operable to cause the data processing equipment to:
   perform a digital signature operation embedding digital signature information in the first or second electronic document, the digital signature operation being performed using the digital signature module after optionally modifying the first or second electronic document; and
   transmit the first or second electronic document, including the embedded digital signature module and the digital signature information.

36. The computer program product of claim 34, wherein:
   the instructions for receiving a signed first electronic document cause the data processing equipment to receive the signed first electronic document as a user in a multi-user sequence defined by a workflow; and
   the instructions for transmitting the first electronic document cause the data processing equipment to transmit the first electronic document to another user in the workflow.

37. The computer program product of claim 34, wherein:
   the instructions for performing the digital signature operation cause the data processing equipment to perform the digital signature operation on a portion of the first or second electronic document; and
   the instructions for transmitting the first or second electronic document cause the data processing equipment to transmit only the portion of the first or second electronic document on which the digital signature operation is performed.

38. The computer program product of claim 34, further comprising instructions operable to cause the data processing equipment to receive input adding content to the first or second electronic document in the user application, wherein the instructions for using the digital signature module cause the data processing equipment to perform a digital signature operation on the added content.

39. The computer program product of claim 34, further comprising instructions operable to cause the data processing equipment to receive input modifying content of the first or second electronic document in the user application, wherein the instructions for using the digital signature module cause the data processing equipment to perform a digital signature operation on the modified content.

40. A computer system, comprising:
   means for accessing a first electronic document using a user application, the first electronic document including embedded digital signature rights information and an embedded digital signature module, the digital signature module being operable to perform digital signature operations on the first electronic document;

means for extracting the embedded digital signature rights information and the embedded digital signature module using the user application;

means for authenticating the extracted digital signature rights information and the extracted digital signature module;

means for using the digital signature module to perform one or more of the digital signature operations on the first electronic document in the user application where using the digital signature module to perform the one or more digital signature operations includes:

receiving a request to perform a digital signature operation, determining whether the requested digital signature operation is authorized, and if the digital signature operation is authorized using the digital signature module to perform the requested digital signature operation;

means for identifying a second electronic document using a user application, the second electronic document being a document other than the first electronic document, the second document being identified in the digital signature rights information of the first electronic document; and means for using the digital signature module to perform one or more of the digital signature operations on the second electronic document in the user application.

41. The system of claim 40, wherein using the digital signature module includes:

validating the digital signature module; and using the digital signature module to perform other digital signature operations only if the digital signature module is validated.

42. The system of claim 40, wherein:

using the digital signature module includes signing the first and second electronic documents.

43. The system of claim 40, wherein:

using the digital signature module includes authenticating a digital signature in the first and second electronic documents.

44. The system of claim 40, wherein:

using the digital signature module includes using the digital signature module running on a server.

45. The system of claim 40, wherein:

including the digital signature module includes including a reference to the digital signature module.

46. The system of claim 40, wherein:

determining whether the requested digital signature operation is authorized includes determining whether the requested digital signature operation is authorized based on rights information associated with the digital signature module, the user application, or the first electronic document.

47. The system of claim 46, wherein:

the rights information is operable to specify the digital signature operations that can be performed on the first and second electronic documents.

48. The system of claim 47, wherein:

the rights information is operable to specify constraints on the digital signature operations that can be performed on the first or second electronic document.

49. The system of claim 40, wherein:

using the digital signature module includes performing a digital signature operation on a portion of the first or second electronic document or on a user added content portion of the first or electronic document.

50. The system of claim 40, further comprising:

means for receiving input adding content to the first or second electronic document in the user application, wherein using the digital signature module includes performing a digital signature operation on the added content.

51. The system of claim 40, further comprising:

means for receiving input modifying content of the first or second electronic document in the user application, wherein using the digital signature module includes performing the digital signature operations on the modified content.

52. The system of claim 40, wherein:

the first or second electronic document is a PDF document.

* * * * *

UNITED STATES PATENT AND TRADEMARK OFFICE
CERTIFICATE OF CORRECTION

PATENT NO. : 7,370,206 B1
APPLICATION NO. : 10/656593
DATED : May 6, 2008
INVENTOR(S) : Oliver Goldman Page 1 of 1

It is certified that error appears in the above-identified patent and that said Letters Patent is hereby corrected as shown below:

Claim 10:
    column 10, line 47:
        insert --second-- after "or"

Claim 34:
    column 14, line 11:
        delete ",", and insert --;--

Claim 40:
    column 15, line 19:
        insert --,-- after "authorized"

Claim 49:
    column 16, line 26:
        insert --second-- after "or"

Signed and Sealed this

Third Day of March, 2009

JOHN DOLL
*Acting Director of the United States Patent and Trademark Office*